March 31, 1970  KARL-HEINZ SIEGEL  3,503,112
APPARATUS FOR ALIGNING AND CLOSING PROFILED BARS OF A
FASTENER OF A WRAPPER OF FLEXIBLE
PLASTICS MATERIAL
Filed Jan. 9, 1967  3 Sheets-Sheet 1

March 31, 1970  KARL-HEINZ SIEGEL  3,503,112
APPARATUS FOR ALIGNING AND CLOSING PROFILED BARS OF A
FASTENER OF A WRAPPER OF FLEXIBLE
PLASTICS MATERIAL
Filed Jan. 9, 1967  3 Sheets-Sheet 3

United States Patent Office 3,503,112
Patented Mar. 31, 1970

3,503,112
APPARATUS FOR ALIGNING AND CLOSING PROFILED BARS OF A FASTENER OF A WRAPPER OF FLEXIBLE PLASTICS MATERIAL
Karl-Heinz Siegel, Birkenstrasse 1a, Schwaig, via Nuremberg, Germany
Filed Jan. 9, 1967, Ser. No. 607,926
Claims priority, application Germany, Feb. 7, 1966, A 51,516; June 22, 1966, A 52,819
Int. Cl. B23p 19/04
U.S. Cl. 29—202.5                                                8 Claims

ABSTRACT OF THE DISCLOSURE

This disclosure relates to apparatus for aligning and closing profiled strips with a fastener of a wrapper of flexible plastics material in the form of seamless tubing. The inside surfaces of the tubing are superimposed after leaving the pinch rolls and are then separated by a weak air cushion. The tubing portion provided with the profiled strips is moved through a closing element, which embraces said tubing portion from the outside. The apparatus may comprise closing elements in the form of grooved members and/or of cooperating rollers.

---

Figure 1:
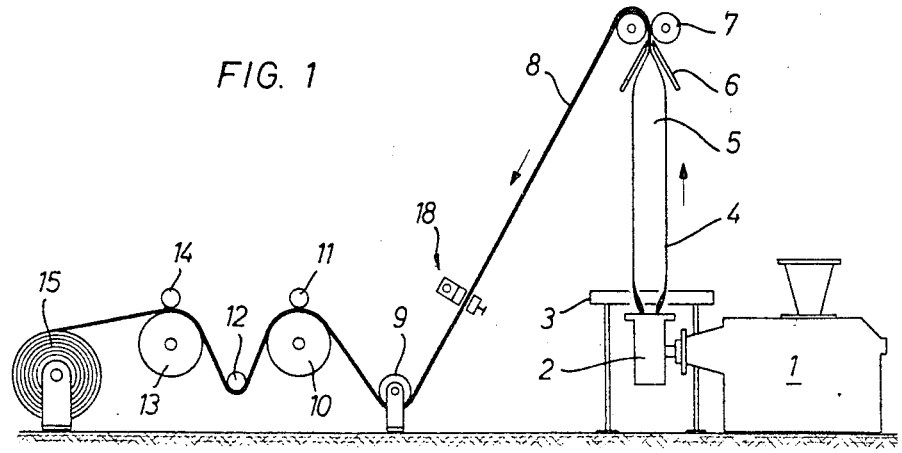

This invention relates to apparatus for aligning and closing profiled strips which are provided in a seamless tubing and form parts of a fastener of a flexible wrapper of plastics material.

In a known process of this kind, a device for aligning the profiled strips and a device for closing the profiled strips are employed. The device for aligning the profiled strips is contained inside the tubing and for this reason must conform to the diameter of the respective tubing so that the device must be adjustable. To enable an arrangement of the device for aligning the profiled strips inside the tubing, the latter must be slit open when the production run begins. Besides, a holder for the device for aligning the profiled strips must be provided outside the tubing as said device is freely slidable within the tubing. The actual aligning elements of the device are fan-shaped. The device is relatively large because it must have a substantial weight. It is known in the manufacture of tubing of plastics material that the diameter of the tubing may decrease. In this case the device for aligning the profiled strips, which is freely slidable in the tubing, will be pulled along by the tubing and may damage the plant if the operators do not give attention. It is also known that an increase in the diameter of the tubing due to fluctuations of the air volume is inevitable. In this case, the device for aligning the profiled strips no longer contacts the inside surfaces of the tubing so that the profiled strips do not slide into the fan-shaped grooves and are not aligned. Finally, the known process requires a relatively long path between the pinch rolls and the take-up roll for the tubing of plastics material because the device for aligning the profiled bars is freely slidable inside the tubing so that the latter must move along a substantially vertical path in the region where the profiled strips are to be aligned.

In an apparatus of the kind described initially hereinbefore, the object set forth is accomplished by the invention in that the inside surfaces of the tubing, which are superimposed after leaving the pinch rolls, are separated by a weak air cushion, and the tubing portion provided with the profiled bars is then moved through a closing element, which embraces said tubing portion from the outside. When leaving the pinch rolls, the inside surfaces of the tubing adhere to each other because the tubing is still warm. The known device effects a mechanical separation of the superimposed inside surfaces. This separation is pneumatically effected according to the application. The air cushion may be formed, e.g., by slightly spacing the movable pressure roll of the pinch roll from the backing roll for a short time at the beginning of the production run so that part of the air which is required in any case for supporting the tubing can be used to form the air cushion according to the invention.

The other object of the invention is accomplished according to the invention in that the carriers for the closing elements of the closing device are spaced apart sufficiently to permit of an unobstructed passage of the tubing portion which carries the profiled strips, and each closing element consists of a groove, which conforms to the associated profiled strips, the openings of said grooves facing each other. Such a closing device is very simple in structure and can perform its function without being arranged inside the tubing. Whereas the known apparatus consists of three structural elements, namely, the device for aligning the profiled strips, the holding device for the aligning device, and the closing device, the inventor has recognized that the closing device when designed according to the invention performs also the function of aligning the profiled strips. It has also been found that the profiled strips will be perfectly aligned even if the grooves are not fan-shaped. Obviously the grooves may have a fan-shaped entrance portion, although this is not essential for the invention. Finally, it has been found that the grooves of the closing device may be relatively short and may be only 15 mm. long, e.g. The selected spacing between the carriers for the closing elements ensures that the profiled strips of the fastener will reliably interengage and close the wrapper of plastics material, and that the tubing is not distorted while moving through the closing device.

In a development of the invention, the carriers for the closing elements have rounded surfaces facing the tubing and form a narrow bearing surface only along the grooves. As a result, the tubing can be introduced into the closing device without obstruction and the tubing is not distorted while moving through the closing device.

In a preferred development of the invention, the carrier for one closing element is movable about an axis which is parallel to the path of the tubing and the movable carrier is under the action of a tension spring. With such closing device, the distance between the carriers need not be determined before. The movable carrier may initially lie on the other carrier. The spacing required for the passage of the tubing is adjusted by the profiled strips themselves as they enter the closing device.

In a further development of the invention, the distance of the movable carrier from the opposite carrier is adjustable by a screw so that one and the same closing device can be used for profiled strips greatly differing in thickness. Besides, the adjustability of the movable carrier enables an optimum adjustment of the relation of the required closing pressure to the friction which is produced when the tubing moves through the device.

The invention relates further to a closing device for aligning and closing profiled strips which are provided in a seamless tubing and form parts of a fastener of a flexible wrapper of plastics material. In this device the inside surfaces of the tubing are separated from each other by a weak air cushion and that portion of the tubing which is provided with the profiled strips is moved through a closing element, which embraces said tubing portion from the outside. This device is characterized in that the closing element consists of two opposed, rotatable rollers. In a development of the invention, at least one roller has such a conicity that the distance between the rollers is smallest in the middle of their peripheral surface. Surprisingly it has been found that the profiled strips are automatically aligned before the rollers and are caused to interengage between the rollers. The use of a closing element in the form of rotatable rollers is particularly desirable because any friction between the moving tubing and the rollers forming the closing element is avoided.

A first closing element of the kind just described and a second closing element of the previously described kind may obviously be employed within the scope of the invention. It is not necessary, however, to arrange two closing elements in succession. Such an arrangement is only recommendable for exceptional cases involving particularly great difficulties.

The advantages afforded with the design last described may be obtained with the closing device according to the previously described design if the same is provided with needle bearings at the parts in contact with the moving tubing.

Figure 2:
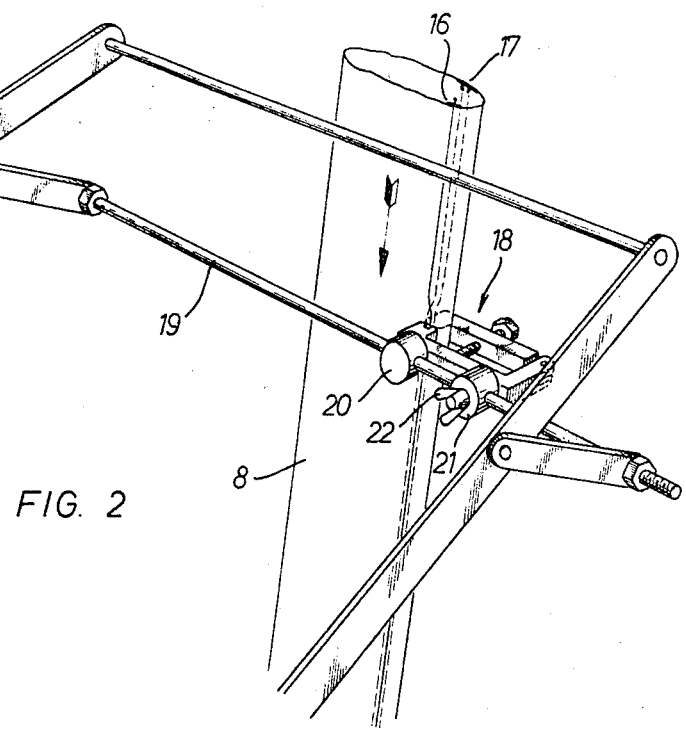
Figure 3:
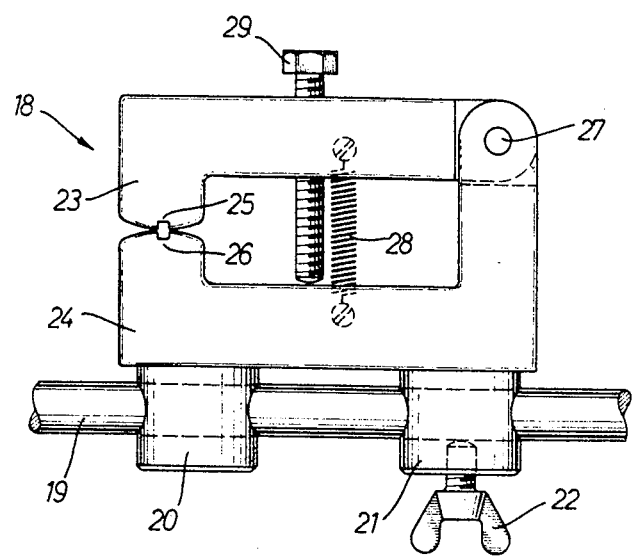
Figure 4:
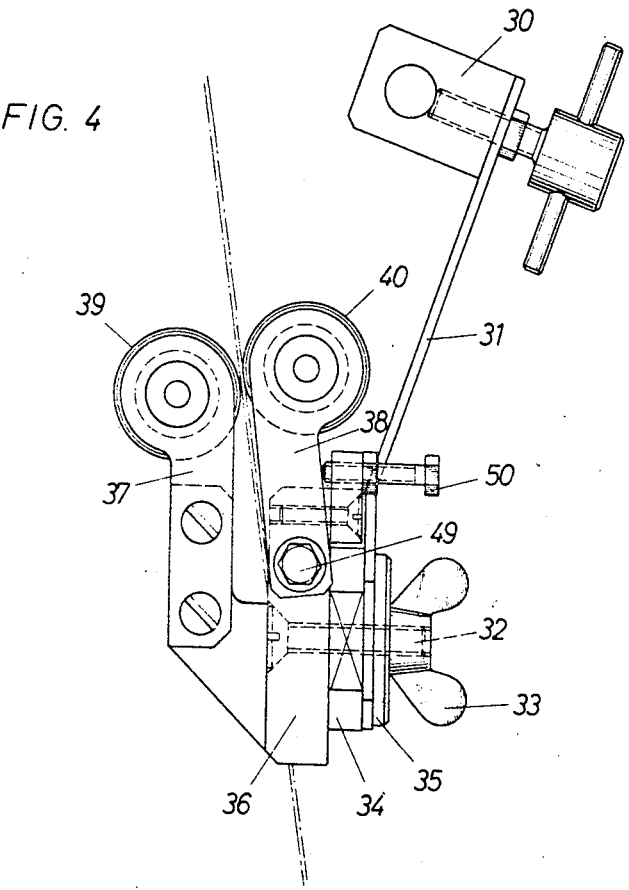
Figure 5:
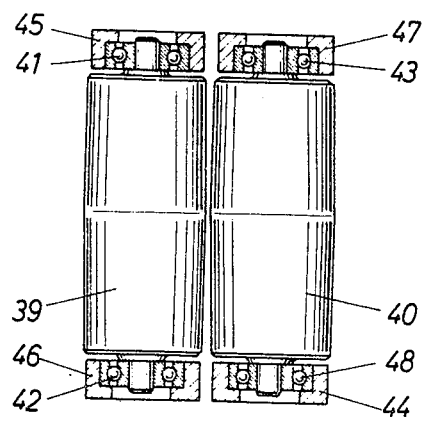

An illustrative embodiment of the invention will now be explained with reference to the drawing, in which FIG. 1 is a diagrammatic view representing the process as a whole, FIG. 2 shows a first embodiment of the closing device according to the invention as used in the process, FIG. 3 shows the closing device proper according to one embodiment of the invention, FIG. 4 is a side elevation showing another embodiment of the device according to the invention, and FIG. 5 is a top plan view showing the rollers of the device of FIG. 4.

As is apparent from FIG. 1, a flexible wrapper of plastics material is made by an extruder 1 having a die 2. A cooling device 3 for a tubing 4 is disposed above the extruder die 2. The tubing 4 is supported by air 5 so that the inside surfaces of the tubing of plastics material do not adhere to each other. The tubing 4 of plastics material is guided along guide plates 6 to pinch rolls 7. After leaving the pinch rolls 7, the superimposed inside surfaces of the tubing 8 are separated so that the tubing has, e.g., the configuration shown in FIG. 2. That portion of the tubing which is provided with profiled strips 16, 17 is then moved through a closing element 18, which embraces said portion from the outside. The tubing moves then around a reversing roller 9, between a withdrawing roll 10 and a pressure roll 11, around another reversing roller 12, between a withdrawing roll 13 and a pressure roll 14, and finally to a take-up roll 15.

As is apparent from FIG. 2, a closing device 18 is mounted by guide elements 20, 21 on a guide rod 19 of a linkage and is secured by a wing screw 22.

The details of the structure of the closing device are apparent from FIG. 3. Carriers 23, 24 for the closing elements are spaced apart sufficiently to permit of a relatively unobstructed passage of the tubing portion provided with the profiled strips 16, 17. Each closing element consists of a groove 25 or 26, which conforms to the respective profiled strip. The openings of said grooves face each other.

A carrier 23 for one closing element 25 is movable about an axis which is parallel to the path of the tubing 8. This movable carrier 23 is under the action of a tension spring 28.

The distance of the movable carrier 23 from the opposite carrier 24 is adjustable by a screw 29. As is readily apparent from FIG. 3, the entire closing device is yoke-shaped.

In the embodiment shown in FIGS. 4 and 5, the closing device is slidably mounted by a bearing bracket 30 on a guide rod, not shown, for movement in a horizontal plane toward the tubing, which is guided at right angles to said plane. A mounting plate 31 extends from the bearing bracket 30 to the closing device proper, which is secured to the mounting plate 31 by a bolt 32 and a wing nut 33, with a nut ring 34 and a washer 35 interposed.

The closing device proper is indicated at 36 and is forked. Rollers 39, 40 are unilaterally carried by prongs 37, 38 of the device 36. Hence, the tubing can move between the rollers 39, 40 without obstruction from top to bottom at right angles to the plane of the drawing.

As is best apparent from FIG. 5, each roller 39 or 40 is held by means of grooved ball bearings 41, 42, 43 and 48 in left-hand and right-hand carrying plates 44–47. The two rollers 39, 40 have such a conicity that the distance between the rollers is smallest in the middle of their peripheral surface. Owing to this design, the tubing and its profiled bars are automatically centered to the middle of the rolls 39, 40.

As is shown in FIG. 4, the prong 38 is pivoted about a pin 49, so that the distance between the rollers 39 and 40 can be varied by an adjusting screw 50.

The closing device according to the invention is operated in such a manner that the wrapper tubing of plastics material is made by an extruder with an extruding die and is then fed to a cooling device and supported by air so that the inside surfaces of the tubing of plastics material do not adhere to each other. The tubing of plastics material is then fed along guide plates to pinch rolls. After leaving said rolls, the superimposed inside surfaces of the tubing are separated and that portion of the tubing which is provided with the profiled bars is moved through the closing device according to the invention. The closing device aligns the profiled strips and causes them to interengage. From the closing device, the tubing is moved past further roll means to the take-up roll. In difficult cases, the closing device according to the invention may be succeeded in the path of the tubing by a second closing device for safety purposes. The second closing device may be designed as described with reference to FIGS. 4 and 5 or like the embodiments of FIGS. 2 and 3.

What is claimed is:

1. Apparatus for aligning and closing profile strips arranged on the interior surface of a seamless tube comprising means in the form of an air cushion to separate the inner wall surfaces of the tube, closing elements defining facing grooves complementary in shape to the corresponding profile strips located outside of the tube section in proximity with the profiled strips, and supports mounting said closing elements spaced from each other with said grooves aligned to allow passage therethrough of the tube section bearing the profiled strips, during which passage the closing elements force the profiled strips together.

2. Apparatus for aligning and closing profile strips arranged on the interior surface of a seamless tube comprising means in the form of an air cushion to separate the inner wall surfaces of the tube, closing elements in the form of two opposite rotatable rollers located outside of the tube section in proximity with the profiled strips, and supports mounting said closing elements spaced from each other with a gap defined therebetween to allow a passage therethrough of the tube section bearing the profiled strips, during which passage the closing elements force the profiled strips together.

3. Apparatus according to claim 1, wherein the support of the one closing element is movable about an axis parallel to the axis of movement of the tube and is biased by a spring toward the other closing element.

4. Apparatus according to claim 3, wherein the spacing of the movable support from the other support is adjustable by means of a screw.

5. Apparatus according to claim 1, wherein the closing elements are in the form of a yoke.

6. Apparatus according to claim 2, wherein at least one roller is axially tapered in such a manner that the spacing of the rollers is smallest at their mid-plane.

7. Apparatus according to claim 2, wherein at least the support of one roller can be adjustably positioned relative to the path of movement of the tubes.

8. Apparatus according to claim 2, wherein the rollers are cantilever mounted on the supports.

References Cited

UNITED STATES PATENTS

| | | | |
|---|---|---|---|
| 2,359,532 | 10/1944 | Searle | 29—234 |
| 2,948,324 | 8/1960 | Penrose | 72—178 |
| 3,026,924 | 3/1962 | Lunt et al. | 29—202.5 |
| 3,126,044 | 3/1964 | Riso | 72—428 |
| 3,397,442 | 8/1968 | McGean | 29—202.5 |

THOMAS H. EAGER, Primary Examiner

U.S. Cl. X.R.

18—14; 29—234; 72—428; 364—95